US012478972B2

(12) United States Patent
Kuitunen

(10) Patent No.: US 12,478,972 B2
(45) Date of Patent: Nov. 25, 2025

(54) SPACER PLATE, A STACKABLE RACK, A STACKED ASSEMBLY OF AT LEAST TWO RACKS, AND USE OF A SPACER PLATE

(71) Applicant: Sartorius Liquid Handling oy, Helsinki (FI)

(72) Inventor: Tuomas Kuitunen, Helsinki (FI)

(73) Assignee: Sartorius Liquid Handling oy, Helsinki (FI)

( * ) Notice: Subject to any disclaimer, the term of this patent is extended or adjusted under 35 U.S.C. 154(b) by 483 days.

(21) Appl. No.: 17/317,329

(22) Filed: May 11, 2021

(65) Prior Publication Data

US 2021/0354146 A1 Nov. 18, 2021

(30) Foreign Application Priority Data

May 13, 2020 (EP) .................................... 20174502

(51) Int. Cl.
*B01L 9/00* (2006.01)

(52) U.S. Cl.
CPC ......... *B01L 9/543* (2013.01); *B01L 2200/021* (2013.01); *B01L 2200/028* (2013.01)

(58) Field of Classification Search
None
See application file for complete search history.

(56) References Cited

U.S. PATENT DOCUMENTS

| | | | |
|---|---|---|---|
| 5,827,745 | A | 10/1998 | Astle |
| 9,662,654 | B2 | 5/2017 | Iten et al. |
| 2012/0257953 | A1 | 10/2012 | Williams et al. |
| 2013/0336852 | A1 | 12/2013 | Rethwisch et al. |
| 2015/0174579 | A1 | 6/2015 | Iten et al. |
| 2018/0221884 | A1 | 8/2018 | Mendez et al. |
| 2019/0299217 | A1 | 10/2019 | Motadel et al. |

FOREIGN PATENT DOCUMENTS

| | | | |
|---|---|---|---|
| CN | 104080708 | A | 10/2014 |
| DE | 102015006731 | A1 | 12/2016 |
| EP | 3006110 | A1 | 4/2016 |
| EP | 3643407 | A1 | 4/2020 |
| JP | 2010538924 | A | 12/2010 |
| RU | 2270721 | C2 | 2/2006 |
| RU | 115687 | U1 | 5/2012 |
| RU | 2622432 | C2 | 6/2017 |
| WO | WO2009036197 | A1 | 3/2009 |

*Primary Examiner* — Paul S Hyun
(74) *Attorney, Agent, or Firm* — Laine IP Oy

(57) ABSTRACT

According to an aspect of the present invention, there is provided a spacer plate for a rack for disposable pipette tips, the rack comprising: a tip plate comprising openings, the openings being adapted for holding a first set of disposable pipette tips. The rack is stackable on another rack adapted for holding a second set of disposable pipette tips, to a nested and stacked configuration; wherein: the spacer plate is configured to be fixed under the tip plate; the spacer plate comprises a plurality of openings, the openings being adapted to receive narrow ends of the disposable pipette tips held by the tip plate; and in the nested and stacked configuration of the rack, the spacer plate is configured to delimit upward-directed movement of disposable pipette tips held by the another rack.

10 Claims, 12 Drawing Sheets

SPACER PLATE, A STACKABLE RACK, A STACKED ASSEMBLY OF AT LEAST TWO RACKS, AND USE OF A SPACER PLATE

FIELD

The present invention relates to holders for disposable laboratory consumables, and particularly to stackable racks for pipette tips.

BACKGROUND

Disposable tips for pipettes and other liquid handling devices are often sold in stack-formed entities in which several tip racks or matrices have been stacked on top of each other. An advantage of such packages in relation to single tip racks or tip boxes include space and cost savings and environmental friendliness due to use of less packaging material.

When designing a stack-formed tip package, the tips as well as the rack components must be designed to be stackable and additionally nestable with each other. It is of utmost importance to prevent the nested tips from sticking and adhering to each other as a result of a nested arrangement and of vertical movements of the nested tips relative to each other.

Nested tips adhere to each other particularly easily through their tapered lateral sidewalls if the tips are allowed to freely move relative to each other and thus to penetrate inside each other.

In the case of short tips, it is inherently possible to dimension the rack so that the height of the space between successive racks is sufficiently small in order to delimit the movement of the tips, particularly their wider crown-shaped ends, and to prevent the tips from adhering to each other.

It is known to provide the sidewall of a tip rack with shapes that facilitate stacking of the racks and fixes the height of the space inside the stack, between successive racks. For small-volume tips, such as 300 μl tips, the height of the space inside the stack in relation to the height of the crown part in the wider tip end is such that adherence of successive tips becomes prevented without further technical considerations.

However, when the length and volume of the tips is large, such as 1 000 μl, concomitantly the height of the space between successive racks increases. This leads to a situation where the tips are capable of moving upwards from their original rest position in a rack opening by significant distances. In such as situation a lower-lying tip may contact an upper, nested tip and adhere to it.

Thus there is a need for designing a stackable tip rack in which adherence of nested tips in the stacked configuration is effectively prevented.

There is a need for providing an improved stackable tip rack for use in both hand-held and automated liquid handling devices.

There is a need to improve stackability of holders for large-volume tips.

There is also a need to provide a space and material saving solution to stack tip racks.

US 2015174579 A1 describes a frame-shaped, essentially rectangular spacer for pipette tip carriers stacked one on top of another. The spacer is implemented to form a stabilizing support connection with an essentially rectangular pipette tip carrier positioned on the spacer. The spacer includes centering spring elements, which are arranged on the inner side of all longitudinal sides and transverse sides, having a springy part spaced apart in relation to the inner side of the respective side wall.

It is an aim of the present invention to overcome at least a part of the disadvantages in the known solutions to stack tip holders.

SUMMARY OF THE INVENTION

The invention is defined by the features of the independent claims. Some specific embodiments are defined in the dependent claims.

According to a first aspect of the present invention, there is provided a spacer plate for a rack for disposable pipette tips, the rack comprising: a tip plate comprising openings, the openings being adapted for holding a first set of disposable pipette tips; wherein the rack is stackable on another rack adapted for holding a second set of disposable pipette tips, to a nested and stacked configuration; wherein: the spacer plate is configured to be fixed under said tip plate; the spacer plate comprises a plurality of openings, the openings being adapted to receive narrow ends of the disposable pipette tips held by the tip plate; and in the nested and stacked configuration of the rack, the spacer plate is configured to delimit upward-directed movement of disposable pipette tips held by said another rack.

Various embodiments of the first aspect may comprise at least one feature from the following bulleted list:

- The rack comprises two pairs of opposing lateral sidewalls, each sidewall comprising an outer surface, an inner surface, an upper edge and a lower edge, and two lateral edges, the sidewalls being joined to each other via their lateral edges; the tip plate is connected to the upper edges of the sidewalls.
- The spacer plate is configured to be fixed to at least one lateral sidewall of the rack and/or to a lower surface of the tip plate, to be located under said tip plate and parallel to it.
- Said plurality of openings comprises or consists of a matrix of openings.

According to a second aspect of the present invention, there is provided a stackable rack for disposable pipette tips, comprising: a tip plate comprising a set of openings, the openings being adapted for holding a first set of disposable pipette tips; wherein the rack is stackable on another rack adapted for holding a second set of disposable pipette tips, to a nested and stacked configuration; wherein: the rack comprises a spacer plate fixed under said tip plate; the spacer plate comprises a plurality of openings, the openings being adapted to receive narrow ends of the first set of disposable pipette tips held by the tip plate of said rack; and in the nested and stacked configuration of the rack, the spacer plate is configured to delimit upward-directed movement of disposable pipette tips held by said another rack.

Various embodiments of the second aspect may comprise at least one feature from the following bulleted list:

- The rack comprises two pairs of opposing lateral sidewalls, each sidewall comprising an outer surface, an inner surface, an upper edge and a lower edge, and two lateral edges, the sidewalls being joined to each other via their lateral edges; the tip plate is connected to the upper edges of the sidewalls.
- The spacer plate is fixed to at least one lateral sidewall of the rack and/or to a lower surface of the tip plate, and the spacer plate is located under said tip plate and parallel to it.

- In the nested and stacked configuration of the rack, the spacer plate is located above said disposable pipette tips held by said another rack and configured to delimit upward-directed movement of the tips held by said another rack in a direction that is perpendicular to the spacer plate, to prevent adherence of nested tips.
- The spacer plate is detachable and re-attachable.
- The sidewalls of the rack comprise one or more delimiters for limiting mutual nesting of the sidewalls of the rack and said another, lower-lying rack in the nested and stacked configuration.
- Said openings in the spacer plate are circular and have a smaller diameter than the openings in the tip plate of the rack.
- The spacer plate is located immediately below the tip plate so that an upper surface of the spacer plate faces a lower surface of the tip plate; and said openings in the spacer plate are mutually identical and circular and their centres coincide with the centres of the openings in the tip plate; said openings in the spacer plate have a smaller diameter than the openings in the tip plate.

According to a third aspect of the present invention, there is provided a stacked assembly of at least two racks for disposable pipette tips, the assembly comprising: a first rack adapted for holding a first set of disposable pipette tips; a second rack adapted for holding a second set of disposable pipette tips; the first rack has been stacked on top of the second rack to form a nested and stacked assembly; a spacer plate is located between the first and second racks and configured to delimit upward-directed movement of the disposable pipette tips in the second rack.

Various embodiments of the third aspect may comprise at least one feature from the following bulleted list:

- Each rack comprises a tip plate comprising a set of openings, the openings being adapted for holding a set of disposable pipette tips; the spacer plate is fixed under the tip plate of the first rack; the spacer plate comprises a plurality of openings, the openings being adapted to receive narrow ends of the disposable pipette tips held by the tip plate of the first rack; and the narrow ends of the disposable pipette tips held by the first rack are inserted into the openings of the spacer plate and partly nested with the disposable pipette tips held by the second rack.
- The first rack is supported by at least one of the lateral sidewalls of the second rack; and the spacer plate of the first rack does not contact any of the lateral sidewalls or the tip plate of the second rack.
- The stacked assembly comprises a plurality of racks carrying disposable pipette tips.
- Said plurality of racks are stacked on top of each other to form a nested and stacked assembly.
- One spacer plate is located in each inter-rack interspace.
- Said inter-rack interspace is formed between the tips plates of two successive and mutually nested racks in the stack.
- The weight of any of the racks is not resting on any of the spacer plates.
- Successive racks directly contact each other.

According to a fourth aspect of the present invention, there is provided use of a spacer plate between two stacked racks holding disposable pipette tips, for delimiting upward-directed movement of the disposable pipette tips in the lower rack.

Various embodiments of the fourth aspect may comprise at least one feature from the following bulleted list:

- A spacer plate or spacer plates are positioned in one or more inter-rack interspaces, preferably one spacer plate in each inter-rack interspace, in a stack comprising 2 to 10 racks.

Advantages of the Invention

The present invention enables production of stackable holders for both small-volume and large-volume tips.

The present invention enables production of stackable holders for tips in which the length of the tip is large in comparison to the diameter of the tip.

The present invention provides a method to prevent the tips in stacked racks from adhering to each other.

EMBODIMENTS

Figure 1A:
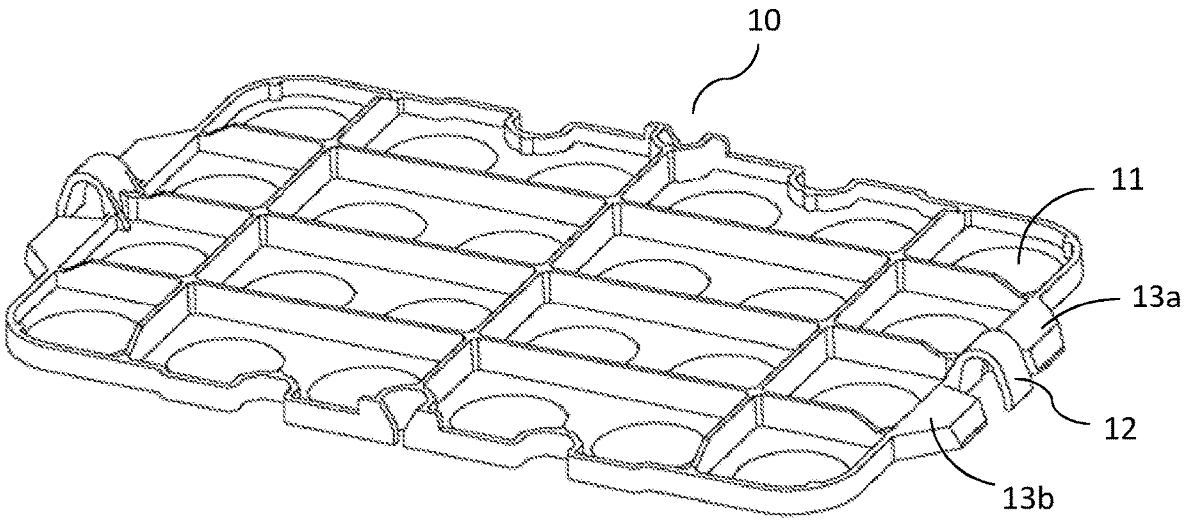
FIG. 1 illustrates a spacer plate in accordance with a first embodiment of the present invention.

The present invention is based on using a spacer between successive tip racks in a stack of tip racks.

In the present context, the term "tip rack" refers to a self-standing holder for tips. Typically, a tip rack comprises an upper surface and lateral sidewalls or feet extending below the upper surface. The upper surface is typically integrally fixed (i.e. not releasable) to the lateral sidewalls or the feet.

In preferred embodiments, a tip rack comprises in it upper surface a matrix of openings (rack openings) for holding a set of tips in a vertically oriented configuration with their wider ends pointing upwards and narrower ends downwards. The narrower ends are thus located in the inner space of the rack as defined by the upper surface and the lateral sidewalls. The rack is stackable with other similar racks to form a vertically oriented stack. Thus each rack in a stack comprises the same layout of openings of the same size so that the openings in successive racks coincide with each other. Upon stacking, both the holders themselves as well as the tips supported by the holders become partly nested.

Particularly, the tips (tip layers) in successive racks do not rest freely on top of each other: such a configuration would immediately lead to a situation where upper tips would adhere to lower tips. Instead, the stacked racks are supported by each other, preferably via their sidewalls or other suitable structures, and an inner space of a determined height is provided between successive stacks.

In one embodiment, the stack comprises at least two tip racks and one spacer plate in each interspace between the racks.

Typically, the interspace between two successive racks refers to the space left between the tip plates of said two successive racks in the stack. Said space is thus defined by the upper surfaces of the two racks and the sidewalls of the upper rack.

In one embodiment, the invention provides an assembly comprising a stack of at least two tip racks, one spacer plate in each interspace between the racks, and tips carried by the racks.

Typically, the spacer plates are distinct, i.e. separate plates, from the uppermost surface of any rack in the stack. Advantageously, the spacer plates do not function as tip carriers.

In preferred embodiments, in a stack, each rack except for the lowermost rack is directly supported and contacted by the rack lying immediately below it. None of the spacer plates carry the upper rack or racks. The weight of any of the racks and tips in the stack is not resting on any of the spacer plates. An advantage of having a non-load-bearing spacer plate is that the use of the spacer plate may be provided for the user as an optional feature, as the spacer plate does not have any stack-supporting or rack-supporting function that would necessitate its presence.

The spacer plate between the tip racks preferably comprises the same number and overall layout of openings as the tip racks.

Thus, in the combination of a rack and a spacer plate below it, the two sets of openings have different functions: Advantageously, the rack openings, together with the rack upper surface, are responsible for carrying the tips and for serving the wider tip ends to a user. The spacer plate openings receive the narrower ends of these tips and, in a stacked configuration, after placing said rack on top of another rack, prevent partly nested tips from adhering to each other.

The spacer plate can be an integral part of a tip rack or it can be provided as a separate part that can be attached under a rack and/or between successive racks when needed.

In preferred embodiments, the spacer plate is positioned between two racks so that it is fixed to the upper rack. The lateral sidewalls and the tip plate of the upper rack and the tip plate of the lower rack define the space in which the spacer plate is located.

In one embodiment, the openings in the spacer plate are circular and have a smaller diameter than the openings in the tip plate of the rack. In this way the spacer plate is adapted to keep the narrow ends of the tips in a centralized position and to prevent the tips from wobbling. The tips are thus supported at two points along their length: immediately below their crowns by the openings of the tip plate, and at a lower position by the openings of the spacer plate.

In a preferred embodiment, the spacer plate openings are loose-fitting with regard to narrower tip ends and adapted to reduce wobbling of the tips.

Figure 1B:
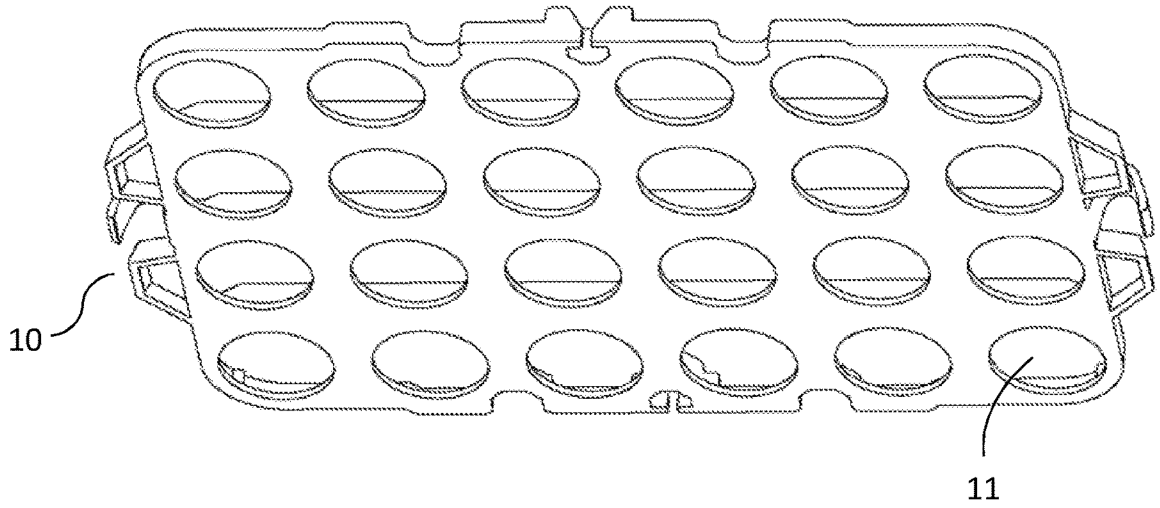

Turning now to the drawings, FIGS. 1A and 1B illustrate a spacer plate 10 in accordance with a first embodiment of the present invention, in two different orientations in three-dimensional space, respectively. The spacer plate comprises a 4×6 matrix of openings 11. The spacer plate can be attached under a rack, to the inner surfaces of two opposing lateral sidewalls of the rack, via the shapes 12, 13*a* and 13*b* in the spacer plate.

Figure 2:
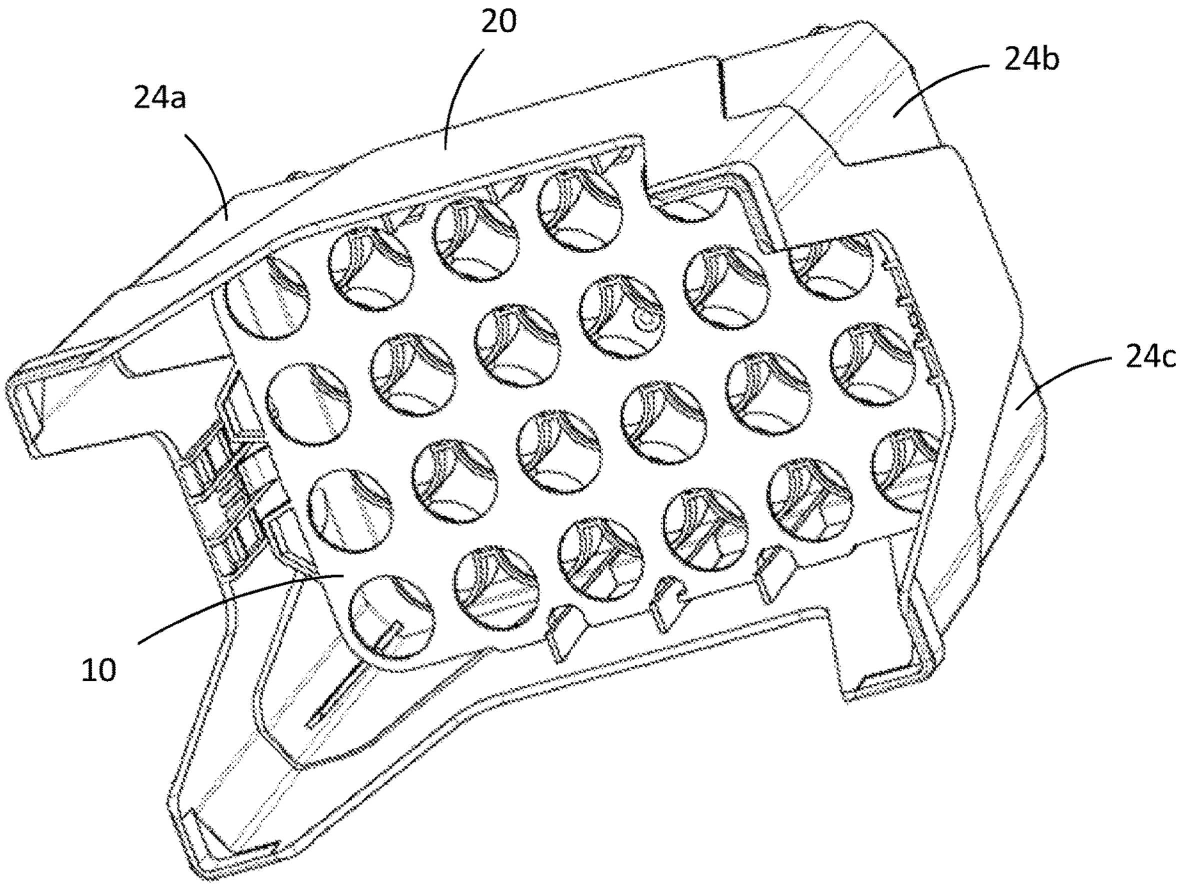
FIG. 2 illustrates a rack comprising a spacer plate in accordance with the first embodiment of the present invention.

FIG. 2 illustrates a rack 20 comprising the spacer plate 10 in accordance with the first embodiment of the present invention. The spacer plate 10 is located under the matrix of openings of the rack. In a stacked configuration, the spacer plate limits vertical movement of the tips in the openings of the lower rack, thereby preventing them from adhering around the tips in the upper rack.

Figure 3:
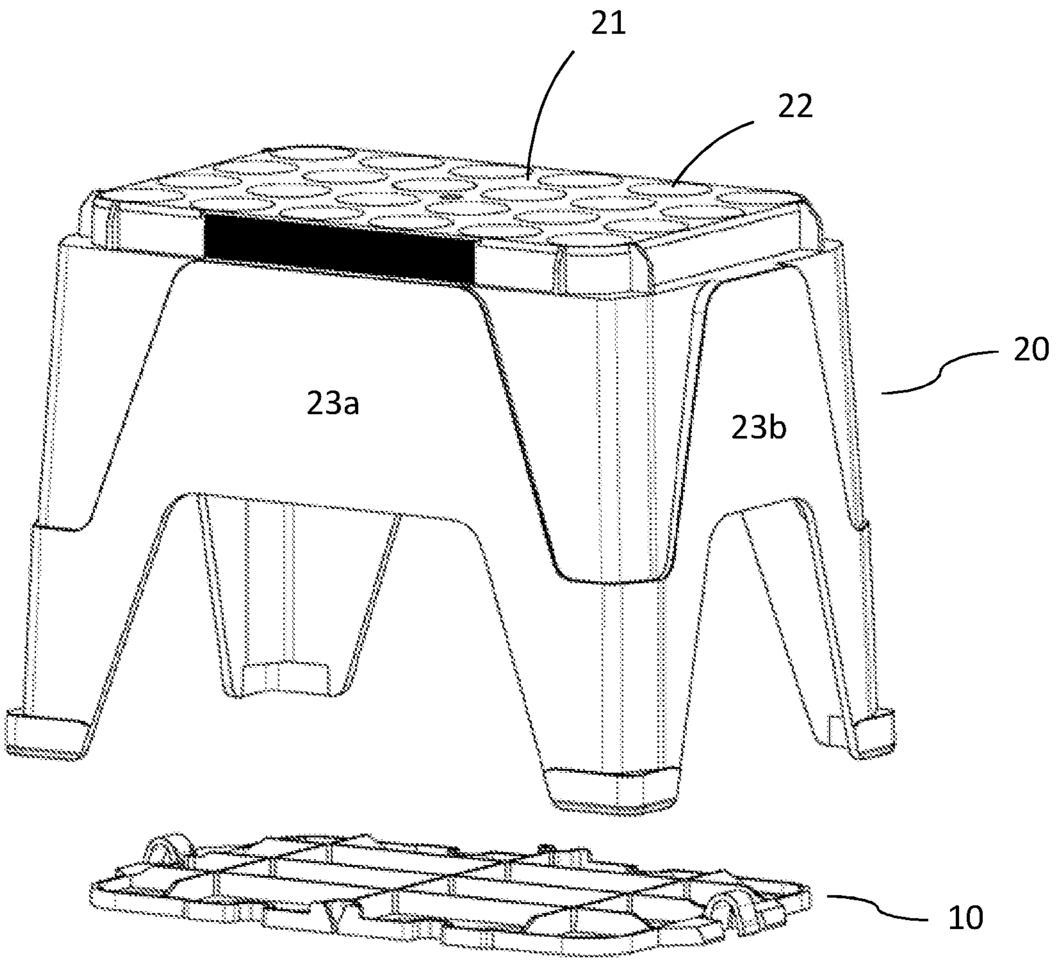
FIG. 3 illustrates the rack of FIG. 2, with the spacer plate detached from the rack.

FIG. 3 illustrates the rack 20 of FIG. 2, with the spacer plate 10 detached from the rack. The rack comprises an upper surface 21 and four lateral sidewalls (including 23*a*, 23*b*). The upper surface 21 comprises a matrix of openings 22 adapted for receiving tips. The overall shape of the rack is tapered: the upper surface has a smaller area than the base of the rack. The base is open to enable nesting of the sidewalls of the rack with the sidewalls of another rack.

Particularly, the upper surface 21 comprising the matrix of openings 22 is adapted for carrying the tips.

Figure 4:
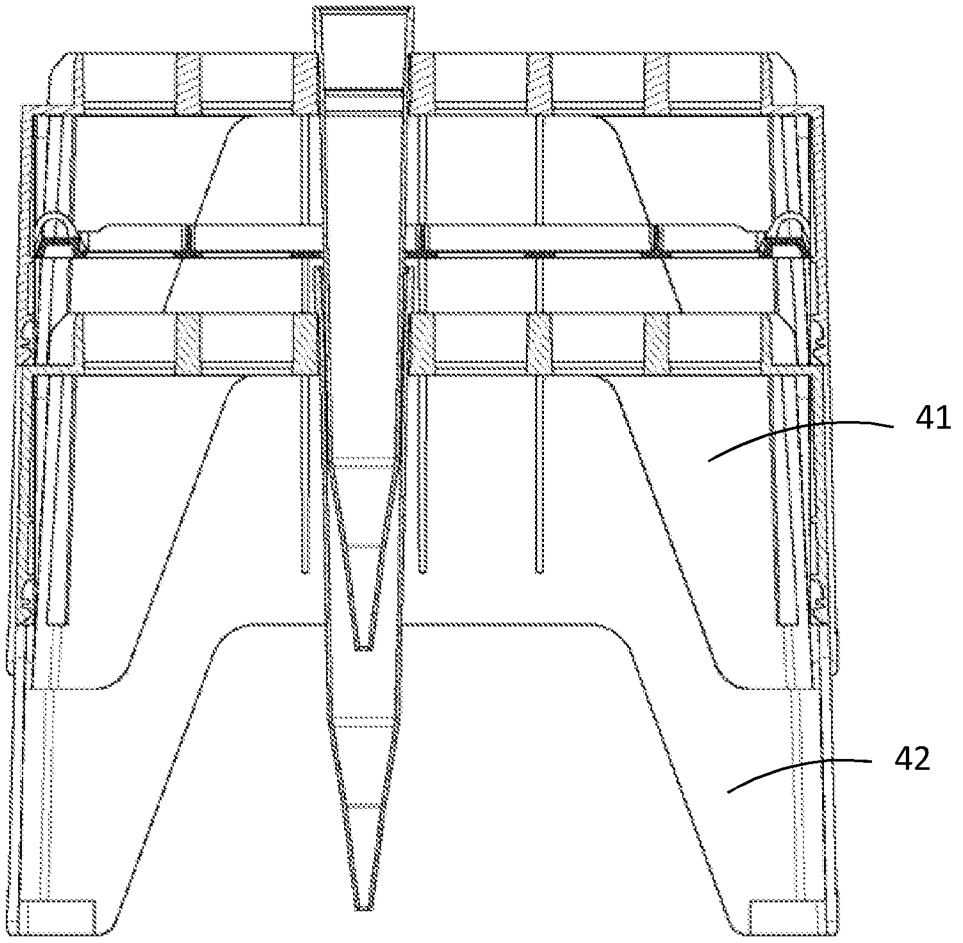
FIG. 4 illustrates a stack of two racks in accordance with an embodiment of the present invention.

FIG. 4 illustrates a stack of two racks 41, 42 in accordance with an embodiment of the present invention.

Figure 5:
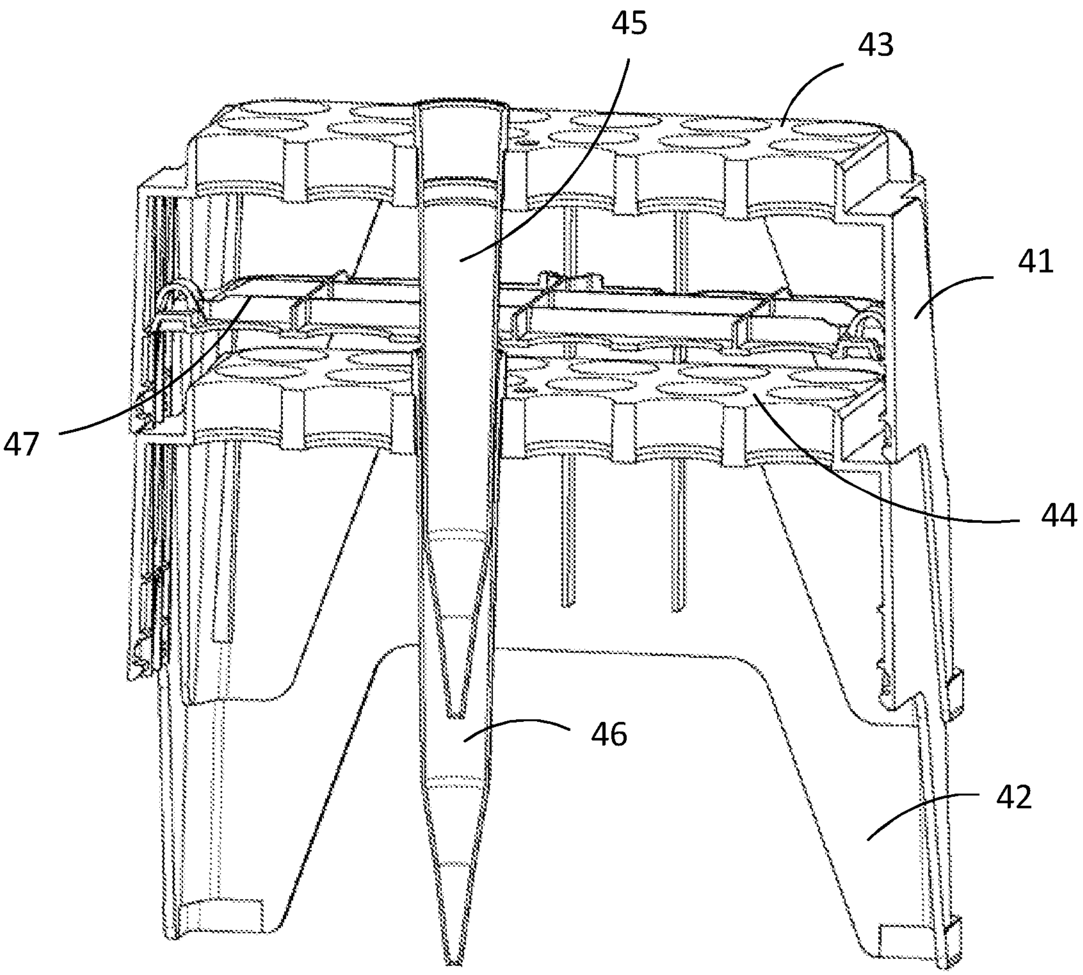
FIG. 5 illustrates the stack of FIG. 4 as a three-dimensional view.

FIG. 5 illustrates the stack of FIG. 4 as a three-dimensional and cross-sectional view. The upper rack 41 comprises a tip plate 43, which contains a matrix of openings configured to receive and hold tips 45. Similarly, the lower rack 42 comprises a tip plate 44, which contains a matrix of openings configured to receive and hold tips 46. Only one tip per rack is shown in FIGS. 4 and 5 for clarity. A spacer plate 47 is located between the racks 41, 42. The spacer plate 47 is fixed to the inner surfaces of the opposing lateral sidewalls of the upper rack 41, and it is configured to delimit upward-directed movement of the tip 46 in order to prevent the tip 46 from adhering to the tip 45. In other words, the spacer prevents the lower-rack tips from approaching the upper-rack tips beyond a pre-determined elevation of the lower-rack tips.

Figure 6:
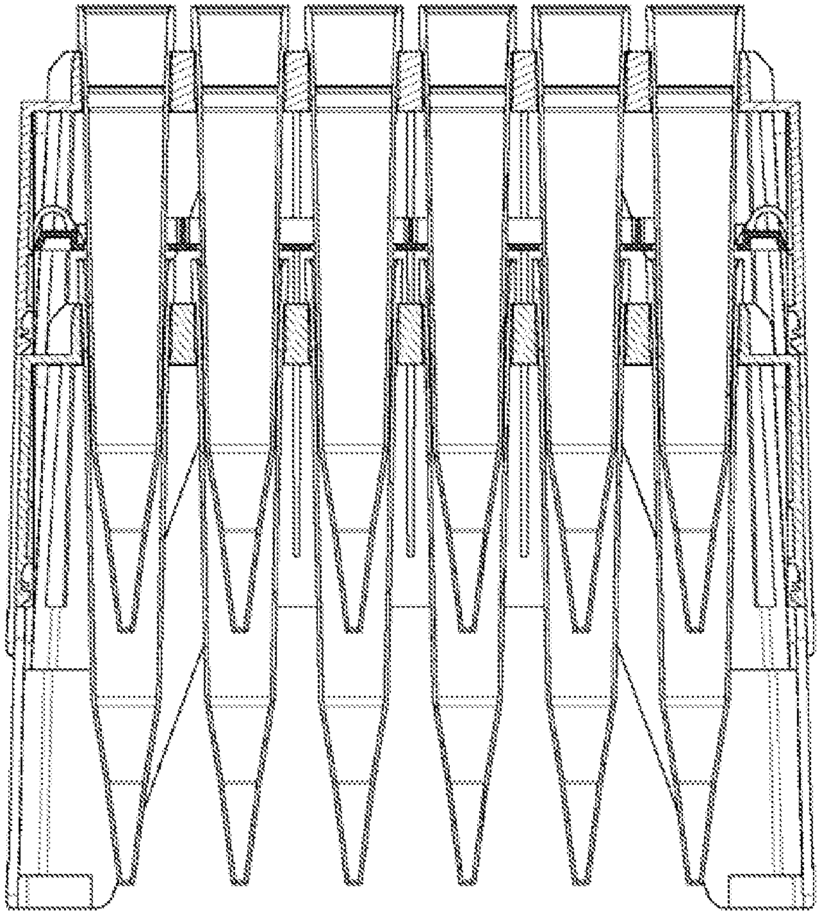
FIG. 6 illustrates a stack of two racks in accordance with an embodiment of the present invention.

FIG. 6 illustrates the stack of FIG. 4, filled with tips. Each rack accommodates 24 tips in the form of a 4×6 matrix.

Figure 7:
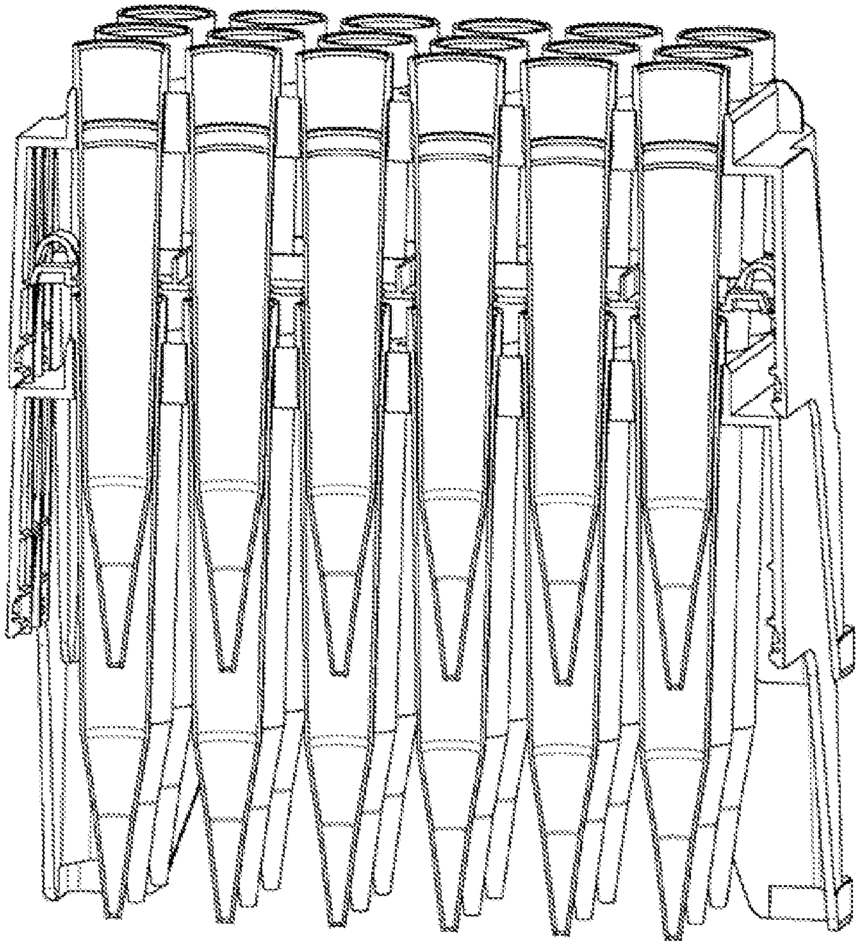
FIG. 7 illustrates the stack of FIG. 6 as a three-dimensional view.

FIG. 7 illustrates the stack of FIG. 6 as a three-dimensional and cross-sectional view.

Figure 8A:
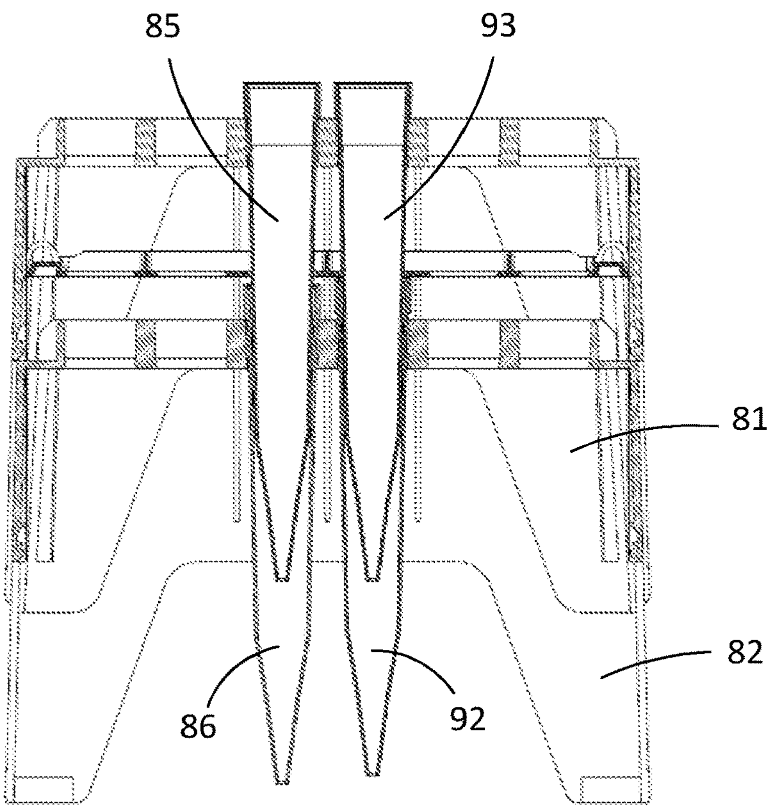
FIG. 8A illustrates a stack of two racks in accordance with an embodiment of the present invention.
Figure 8B:
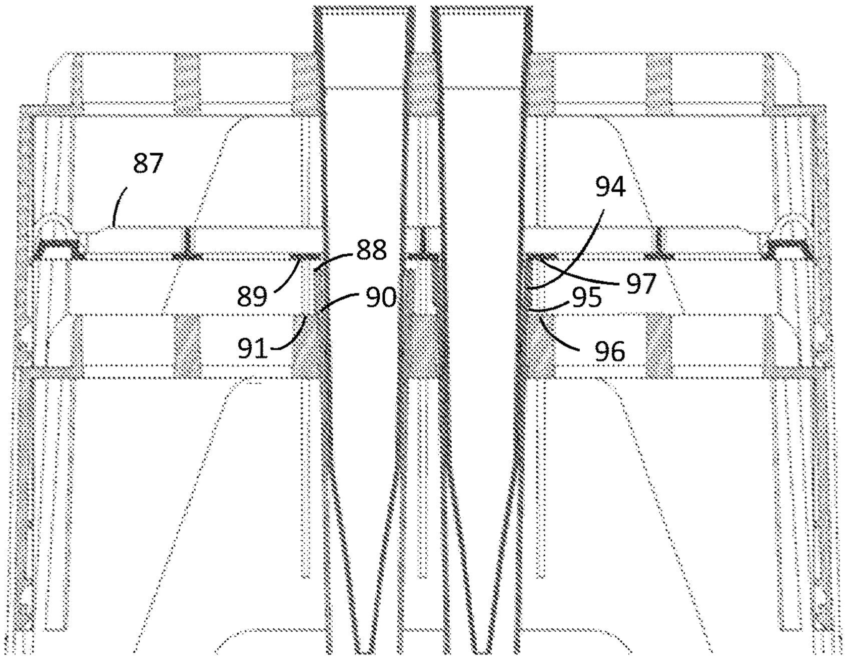
FIG. 8B shows the upper part of FIG. 8A.

FIGS. 8A and 8B show more clearly the functioning of the spacer plate in different configurations of the tips in the lower rack. The upper rack 81 holds tips 85, 93 which are partly nested into corresponding tips 86, 92 in the lower rack 82. The tip 86 in a lower rack 82 is in its lowermost position (rest position), and its crown part 90 rests against the upper surface 91 of the tip plate of the lower rack. The spacer plate 87 is not contacting the tip 86. In this situation, there is a free space between the tip crown upper edge 88 and the lower surface 89 of the spacer plate 87.

The tip 92 in the lower rack 82 is in its elevated position and touches the lower surface 97 of the spacer plate. The spacer plate contacts the crown 94 of the tip 92. In this situation, there is now a free space of the same height between the lower edge 95 of the tip crown and the upper surface 96 of the tip plate of the lower rack. Thus the spacer plate delimits the upward movement of the tip 92; the tip 92 could only be elevated by the distance between the surfaces 95 and 96. As a result, the tip 92 in the lower rack cannot penetrate into the upper-lying tip 93 too deeply and mutual adhering of the tips is avoided. In one embodiment, the distance is at least 0.5 mm.

The lateral sidewalls of the rack preferably comprise indented shapes (such as 24*a*, 24*b*, 24*c* in FIG. 2) via which the rack is stackable with other similar racks. The shapes can be in the form of indented regions located in the lateral sidewalls and/or corners of the rack and extending downwards from the upper surface. When two racks are stacked, they are partly nested, the nesting being delimited by the dimensions of the indented regions in the sidewalls and/or corners of the lower rack. Such stacking creates a space, involving a fixed vertical distance, between the two racks. This space already primarily prevents successive tips from adhering to each other as the upper rack is positioned on the lower rack and in situations where the stack is in a vertical configuration, such as resting on a horizontal surface of a table or like.

Thus the sidewall of the lower rack and its indented shape provides support for the upper rack upon stacking and nesting two racks.

However, any deviation from a vertical configuration of the stack, for example during transport, and particularly a rotation of the stack upside down, might cause tip movement and adherence problems.

In some embodiments, the spacer is a plate comprising a matrix of openings. The plate is connected to the inner surfaces of the sidewalls of the rack. The plate is parallel with the upper surface of the rack and comprises a similar layout of openings as the openings in the upper surface.

Typically, the spacer plate is configured to be fixed to at least one lateral sidewall of the rack and/or to a lower surface of the tip plate, to be located under said tip plate and parallel to it.

In some embodiments, the spacer plate is configured to be fixed to at least one lateral sidewall, preferably two lateral sidewalls of the rack. Such an embodiment is illustrated in FIGS. 1 to 8.

In some embodiments, the spacer plate is configured to be fixed to a lower surface of the tip plate. Such an embodiment is illustrated in FIGS. 9 to 11.

Figure 9A:
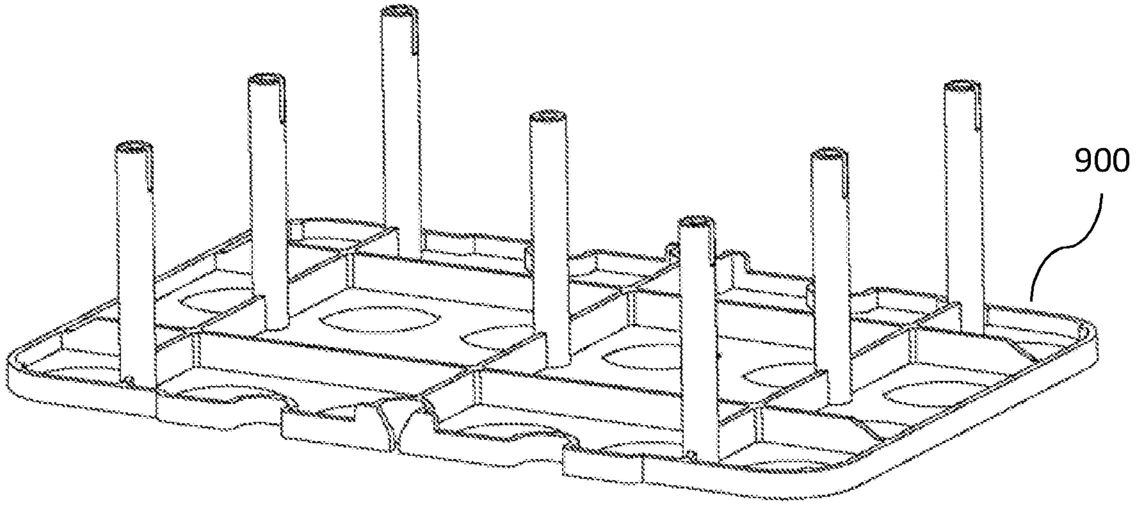
FIG. 9 illustrates a spacer plate in accordance with a second embodiment of the present invention.
Figure 9B:
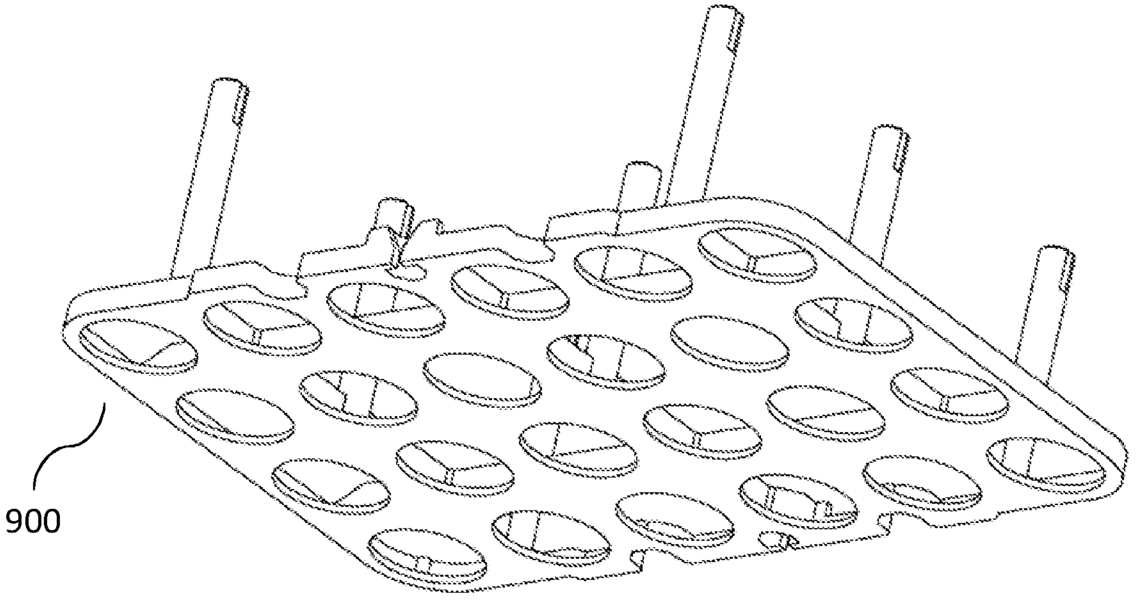

FIGS. 9A and 9B illustrate a spacer plate 900 in accordance with a second embodiment of the present invention, in two different orientations in three-dimensional space, respectively.

Figure 10:
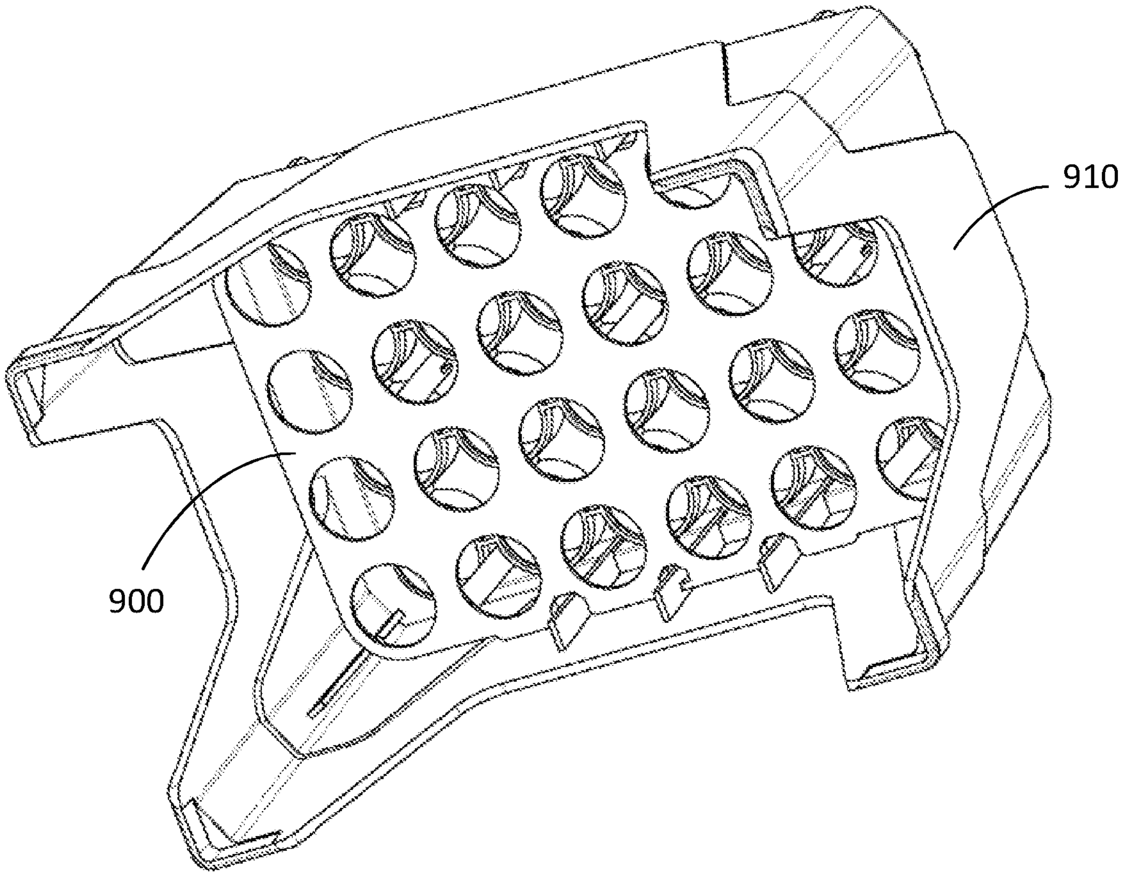
FIG. 10 illustrates a rack comprising a spacer plate in accordance with the second embodiment of the present invention.

FIG. 10 illustrates a rack 910 comprising the spacer plate 900 in accordance with the second embodiment of the present invention.

Figure 11:
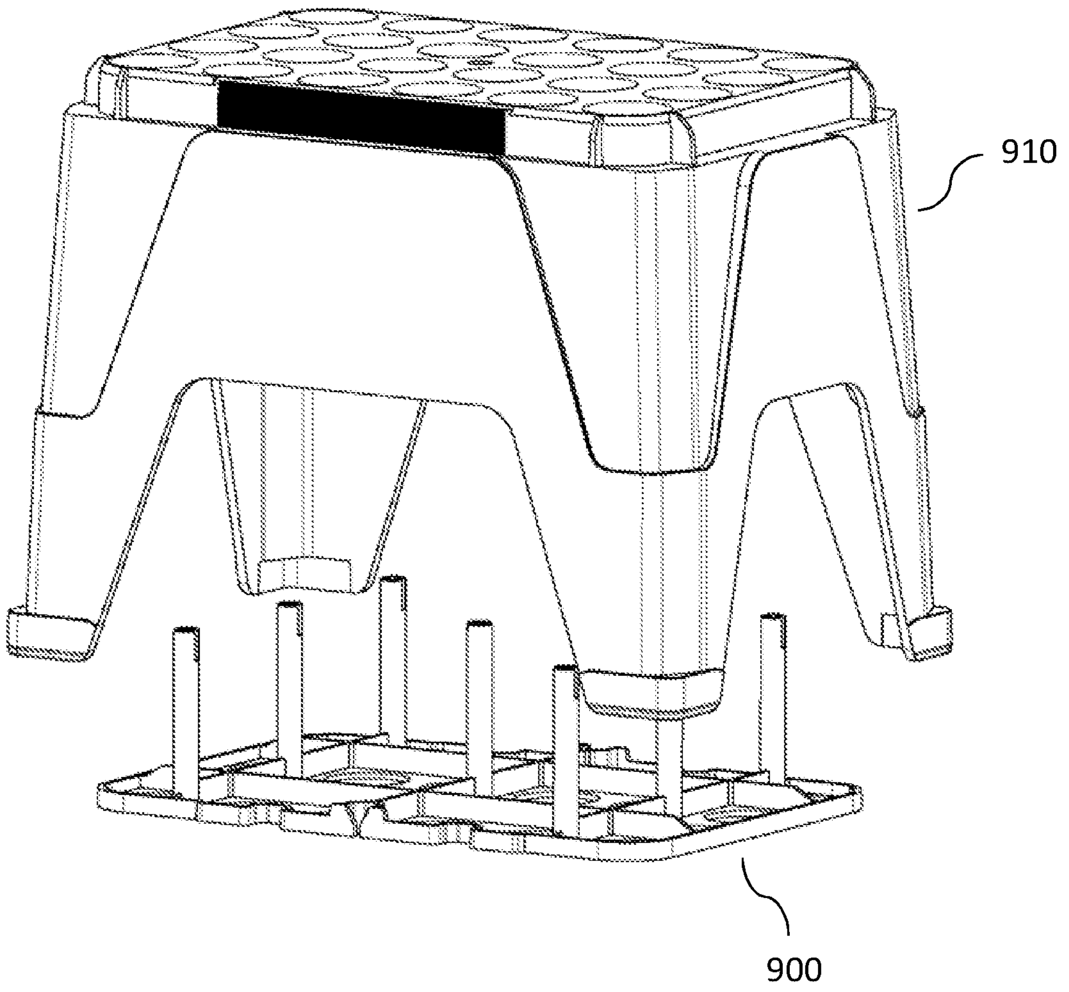
FIG. 11 illustrates the rack of FIG. 9, with the spacer plate detached from the rack.

FIG. 11 illustrates the rack of FIG. 10, with the spacer plate 900 detached from the rack 910.

In the stacked configuration, the spacer plate is preferably located in a close proximity of the upper wider ends of the tips in the lower rack.

Typically, the upper end of a tip comprises a cylinder-shaped crown part (a collar). The tapered part of the tip extends from the crown part. When the tips lie in a rest position in the matrix openings, the lower edges of their crowns typically face the upper surface of the tip plate.

In preferred embodiments, the openings in the tip plate are circular. Each circular opening has been adapted so that its diameter is smaller than the diameter of the tip crown in order to carry the tip so that the crown rests on the tip plate. At the same time the diameter of the opening is adapted to be large enough to enable insertion of the rest of the tip (i.e. the tapered part with a diameter smaller than that of the crown) into the opening.

In preferred embodiments, the openings in the spacer plate are circular and have a smaller diameter than the diameter of the tip crowns so that the crowns of lower-lying tips are not able to penetrate the spacer plate openings but instead the upward movement of the lower-lying tips is delimited by the spacer plate. However, the diameter of the openings in the spacer plate must be large enough in order to receive the narrow ends of the tips held by the upper rack.

Advantageously, the tip plate is not frictionally engaging with the tips that it carries.

Advantageously, the spacer plate is not frictionally engaging with the tips carried by the upper rack. Preferably, the spacer plate is parallel with the upper surface of the upper rack and, in the vertical direction, the location of the spacer plate is adapted so that the narrower ends of the tips carried by the upper rack are inserted into and fit loosely inside the openings in the spacer plate.

Preferably, the spacer plate comprises a matrix of circular openings adapted to receive the narrow ends of the tips held by a rack directly above the spacer plate.

Alternative shapes and numbers of openings in the spacer plate are possible. The openings shall be configured to accommodate and receive the narrow ends of the upper-lying tips while at the same time configured to delimit vertical elevation of each of the lower-lying tips by contacting the wider ends, such as the crown parts, of the lower-lying tips if they become raised from the rest position.

The openings in the spacer plate may be for example rectangular, circular or oval. The openings may have an elongated shape.

Each opening may receive narrow ends of one or more upper-lying tips.

In one embodiment, an elongated opening in a spacer plate is configured to receive narrow ends of an entire row of upper-lying tips.

Figure 12A:
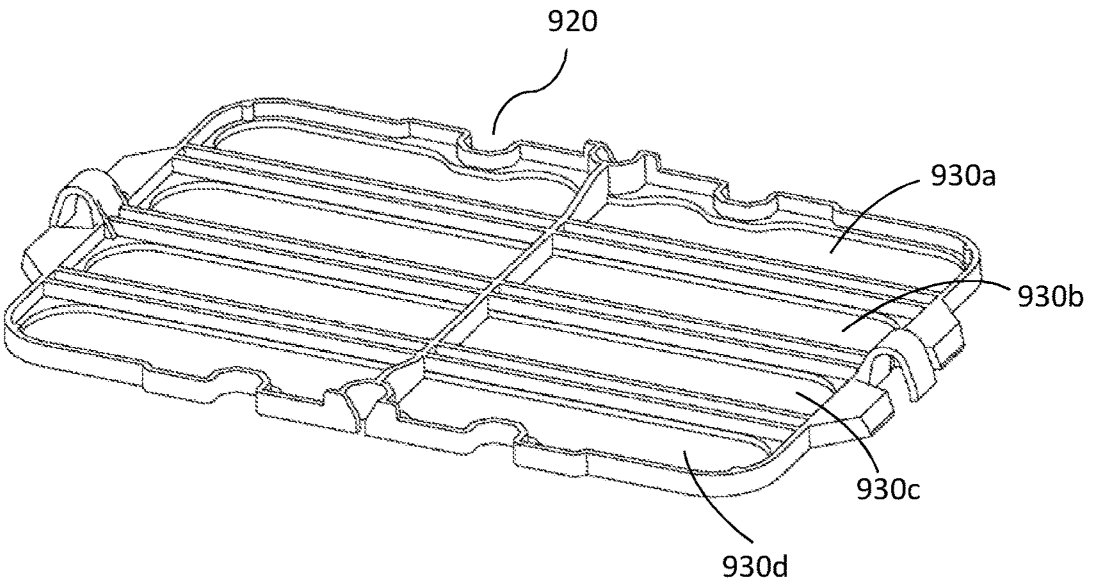
FIGS. 12A, 12B illustrate a spacer plate in accordance with a third embodiment of the present invention.
Figure 12B:
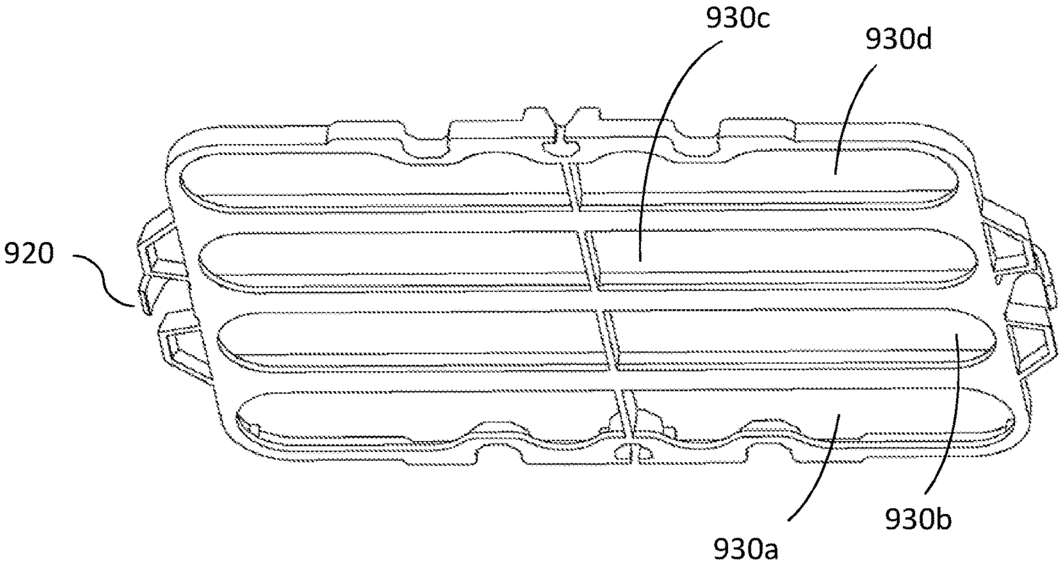

FIG. 12A, 12B illustrate a spacer plate 920 in accordance with a third embodiment of the present invention, in two different orientations in three-dimensional space, respectively. In this embodiment, the spacer plate comprises eight elongated openings, including the openings 930*a*, 930*b*, 930*c* and 930*d*. Each elongated opening is configured to receive the narrow ends of a half-row of upper-lying tips.

In some embodiments, the smallest dimension of each opening in the spacer plate is less than the diameter of the wider ends of the lower-lying tips in order to prevent the wider ends (the crowns) to become inserted into the openings in the spacer plate.

Preferably, at least a part of an upper edge of the crown part in each lower-lying tip is configured to contact the lower surface of the spacer plate in an elevated position of the tip.

The present invention makes it possible to realize a reliably functioning stack of tip racks for large-volume tips and for tips with a large length-to-diameter ratio, and to avoid any adhering of the tips to each other in the stacked configuration.

The present solution is particularly advantageous in view of both hand-held pipettes and automated liquid handling stations and the tips used therein. For example, by means of the present invention it is possible to produce stackable racks for tips with volumes up to 10 000 μl.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

INDUSTRIAL APPLICABILITY

The present invention is industrially applicable at least in the manufacturing of racks for disposable tips usable in liquid handling devices and robots.

CITATION LIST

Patent Literature

US 2015174579 A1

The invention claimed is:

1. A stacked assembly of at least two racks for disposable pipette tips, the assembly comprising:

a first rack comprising a tip plate comprising a plurality of openings, the openings being adapted for holding a first set of disposable pipette tips;

a second rack comprising a tip plate comprising a plurality of openings, the openings being adapted for holding a second set of disposable pipette tips, wherein the first rack is stacked on top of the second rack to form a nested and stacked assembly;

a spacer plate located between the first and second racks and configured to delimit upward-directed movement of the second set of disposable pipette tips in the second rack, and an equal number of racks and sets of disposable pipette tips, wherein the spacer plate comprises a plurality of openings adapted to receive narrow ends of the first set of disposable pipette tips held by the first rack, wherein each of the first rack and the second rack comprises two pairs of opposing lateral sidewalls, each lateral sidewall comprising an outer surface, an inner surface, an upper edge and a lower edge, and two lateral edges, the lateral sidewalls of at least the first rack being joined to each other via the lateral edges of the lateral sidewalls, wherein the tip plate of the first rack is connected to the upper edges of the two pairs of opposing lateral sidewalls of the first rack, wherein the first rack is supported by at least one lateral sidewall of the second rack, and wherein the spacer plate does not contact any lateral sidewalls or the tip plate of the second rack, and wherein a lowermost rack of the stacked assembly is configured to hold a lowermost set of disposable pipette tips of the stacked assembly, wherein each of the lowermost set of disposable pipette tips of the stacked assembly has a top end extending towards a narrow end, wherein a tip plate of the lowermost rack of the stacked assembly holds the top ends of the lowermost set of disposable pipette tips of the stacked assembly, and wherein the top end and the narrow end of each disposable pipette tip in the lowermost set of disposable pipette tips are disposed above a lowermost edge of the lowermost rack.

2. The assembly according to claim 1, wherein:

the spacer plate is fixed under the tip plate of the first rack, and narrow ends of the first set of disposable pipette tips held by the first rack are inserted into the plurality of openings of the spacer plate and are partly nested within the second set of disposable pipette tips held by the second rack.

3. The stacked assembly according to claim 1, wherein the stacked assembly comprises more than two racks carrying disposable pipette tips stacked on one another to form the nested and stacked assembly, wherein an inter-rack interspace is defined between each pair of stacked racks in the stacked assembly, and wherein one spacer plate is located in each inter-rack interspace.

4. The stacked assembly according to claim 1, wherein the weight of the first and second racks do not rest on the spacer plate.

5. The stacked assembly according to claim 1, wherein the spacer plate is fixed to at least one lateral sidewall of the first rack and/or to a lower surface of the tip plate of the first rack, and wherein the spacer plate is located under the tip plate of the first rack and parallel to the tip plate of the first rack.

6. The stacked assembly according to claim 1, wherein the spacer plate is detachable and re-attachable to the first rack.

7. The stacked assembly according to claim 1, wherein the sidewalls of the first rack comprise one or more delimiters for limiting mutual nesting of the sidewalls of the first rack and the second rack in the nested and stacked configuration.

8. The stacked assembly according to claim 1, wherein the plurality of openings of the spacer plate have a smaller diameter than the openings in the tip plate of the first rack.

9. The stacked assembly according to claim 1, the spacer plate is located immediately below the tip plate of the first rack so that an upper surface of the spacer plate faces a lower surface of the tip plate of the first rack;

said openings in the spacer plate are mutually identical and circular and their centres coincide with the centres of the plurality of openings in the tip plate of the first rack; and the plurality of openings in the spacer plate have a smaller diameter than the openings in the tip plate of the first rack.

10. A stacked assembly of at least two racks for disposable pipette tips, the assembly comprising:

a first rack comprising a tip plate comprising a plurality of openings, the openings being adapted for holding a first set of disposable pipette tips;

a second rack comprising a tip plate comprising a plurality of openings, the openings being adapted for holding a second set of disposable pipette tips, wherein the first rack is stacked on top of the second rack to form a nested and stacked assembly;

a spacer plate located between the first and second racks and configured to delimit upward-directed movement of the second set of disposable pipette tips in the second rack; and, an equal number of racks and sets of disposable pipette tips, wherein the spacer plate comprises a plurality of openings adapted to receive narrow ends of the first set of disposable pipette tips held by the first rack, wherein at least the first rack comprises two pairs of opposing lateral sidewalls, each lateral sidewall comprising an outer surface, an inner surface, an upper edge and a lower edge, and two lateral edges, the lateral sidewalls of the first rack being joined to each other via the lateral edges of the lateral sidewalls, wherein the weight of each of the first rack and the second rack does not rest on the spacer plate, and wherein a lowermost rack of the stacked assembly is configured to hold a lowermost set of disposable pipette tips of the stacked assembly, wherein each of the lowermost set of disposable pipette tips of the stacked assembly has a top end extending towards a narrow end, wherein a tip plate of the lowermost rack of the stacked assembly holds the top ends of the lowermost set of disposable pipette tips of the stacked assembly, and wherein the top end and the narrow end of each disposable pipette tip in the lowermost set of disposable pipette tips are disposed above a lowermost edge of the lowermost rack.

* * * * *